United States Patent
Obayashi et al.

(10) Patent No.: US 6,908,162 B2
(45) Date of Patent: Jun. 21, 2005

(54) VEHICLE REGENERATIVE BRAKING APPARATUS

(75) Inventors: Kazuyoshi Obayashi, Chita-gun (JP); Keisuke Tani, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/780,768

(22) Filed: Feb. 19, 2004

(65) Prior Publication Data

US 2004/0239181 A1 Dec. 2, 2004

(30) Foreign Application Priority Data

Feb. 21, 2003 (JP) .................................. 2003-044205

(51) Int. Cl.[7] .............................................. B60T 8/64
(52) U.S. Cl. ..................................... 303/152; 303/20
(58) Field of Search .............................. 322/28, 16, 8; 320/132, 101, 104; 303/152, 20; 701/80, 22; 180/65.1, 65.2, 165, 65.8; 477/4, 185, 188; 318/139, 376; 188/158, 161–163; 307/10.1, 10.7

(56) References Cited

U.S. PATENT DOCUMENTS

| | | | |
|---|---|---|---|
| 5,583,406 A | 12/1996 | Mutoh et al. | |
| 5,694,311 A | 12/1997 | Umeda et al. | |
| 5,731,690 A | 3/1998 | Taniquchi et al. | |
| 5,788,597 A | * 8/1998 | Boll et al. | 477/4 |
| 2004/0124703 A1 | * 7/2004 | Tani et al. | 307/10.1 |
| 2004/0164616 A1 | * 8/2004 | Obayashi et al. | 307/18 |
| 2004/0239181 A1 | * 12/2004 | Obayashi et al. | 303/152 |

FOREIGN PATENT DOCUMENTS

| JP | A 5-276686 | 10/1993 |
|---|---|---|
| JP | A 8-154304 | 6/1996 |

* cited by examiner

Primary Examiner—Douglas C. Butler
(74) Attorney, Agent, or Firm—Oliff & Berridge, PLC

(57) ABSTRACT

A vehicle regenerative braking apparatus of simple structure is provided, which prevents adverse effects on a battery while handling excess power appropriately. In a vehicle regenerative braking, when excess power which exceeds a preferable charge amount of a battery has been generated as a result of regeneration, the excess power is consumed by increased power consumption of a plurality of electrical loads selected from among several electrical loads.

9 Claims, 5 Drawing Sheets

VEHICLE REGENERATIVE BRAKING APPARATUS

CROSS REFERENCE TO RELATED APPLICATIONS

This application is based upon, claims the benefit of priority of, and incorporates by reference Japanese Patent Application No. 2003-44205 filed Feb. 21, 2003.

BACKGROUND OF THE INVENTION

1. Field of the Invention

The present invention relates to a vehicle regenerative braking apparatus.

2. Description of the Related Art

In recent years, a method for reclaiming or regenerating the deceleration energy of a vehicle by means of an electric machine has come into the stage of practical application with the goal of improving vehicle fuel efficiency. It is normal with vehicle regeneration methods to generate a braking force equivalent to the regenerative power (also called electrical braking force), and to make up the remaining required braking force with frictional force of the mechanical brake.

However, during regeneration, if operation of a large power-consuming load (e.g., a PTC heater) is stopped during regeneration, the share of regenerative power generated by the electric machine directed to battery charging increases. Therefore, the amount of power that can be accepted by the battery (maximum charge amount) is exceeded, and there is the possibility of detrimental effects to the battery. Further, the maximum charge amount is a function of multiple variables including the state of charge of the battery (SOC) and battery temperature. In instances such as when the SOC is near a state of full charge and the battery temperature is extremely high, the charge amount should be decreased, as compared to other instances.

As a solution to the aforementioned regenerative braking problem of regenerative power exceeding the maximum charge amount, it is conceivable to reduce the amount of regenerative energy at the point when the battery can no longer accept power, that is, at the point where regenerative power exceeds the maximum charge amount, in other words, when excess power (regenerative power−maximum charge amount) has been generated. However, if regenerative power is suddenly reduced then vehicle braking force (electrical braking force+frictional braking force) is lost and degrades the smoothness of driving as perceived and felt by the driver.

Even when compensation of the lost portion of electrical braking force by an increase in the frictional braking force of the hydraulic brake mechanism is attempted, it is difficult to make the speed of increase of frictional braking force from the hydraulic brake system match the dramatic speed of loss of regenerative power (several milliseconds). The following alternatives were thus conceived in the related art.

According to the related art disclosed in Japanese Patent No. 3,232,823, the efficiency of a generator is degraded when excess power is generated, and the excess power is converted to heat within the generator. The heat is then removed by generator absorption technology. However, when excess power is large it is very difficult to completely consume with this generator absorption technology, depending on how much the efficiency of the generator has been degraded. When using a component dedicated to power generation as an electric machine, adoption is physically impossible.

Japanese Patent Laid-Open Publication No. Hei 8-154304 discloses a switch-controlled discharge resistor which absorbs the excess power. However, with this discharge resistor technology, not only is a costly power resistor necessary, but a switching control device to set the power to be consumed by the discharge resistor to a value corresponding to the amount of excess power is also necessary. This requires increased production cost and increased installation space.

According to the related art disclosed in Japanese Patent Laid-Open Publication No. Hei 5-276686, excess power is directed into a catalytic heater or similar component. However, this entails only adapting the aforementioned PTC heater used as a load for consuming excess power for use as a catalytic heater, and when power is supplied to the catalytic heater at the point when excess power is generated, further consumption of excess power is difficult.

SUMMARY OF THE INVENTION

The present invention was devised to solve the above-mentioned problems, and it is therefore an object to provide a vehicle regenerative braking apparatus simple in structure that prevents adverse effects on a battery while appropriately handling excess power.

A first aspect of the present invention resides in a vehicle regenerative braking apparatus having a generator driven by an engine. The generator performs vehicle braking by generation of regenerative power during vehicle braking. A battery is charged by the regenerative power. A plurality of electrical loads are supplied by the generator and the battery, and a load control apparatus controls the electrical loads. The load control apparatus performs one of calculation, detection, and anticipation of a generation of excess power, which is the regenerative power that exceeds a battery-absorbable maximum charge amount. The load control apparatus also determines an excess power consumption load from the plurality of electrical loads to have excess power absorbed according to one of a calculated value, a detected value, and an anticipated value of the excess power and the excess power absorption capability of the electrical loads before or after generation of the excess power. Finally, the load control apparatus activates the excess power consumption load corresponding to the size of the excess power when generation of the excess power has been one of calculated, detected, and anticipated.

According to the present invention, to cope with the amount of the excess power that has occurred or has been predicted, electrical loads are appropriately selected as excess power consumption loads from a plurality of electrical loads, such that the excess power consumption loads can be made to consume the excess power. Accordingly, differing from the related art where excess power is disposed of by previously determined and fixed electrical loads, excess power can be consumed without incurring the problem of an inability to dispose of excess power owing to electrical loads intended for disposal of excess power already being in operation, nor the problem of needing to increase electrical loads dedicated to excess power consumption apart from pre-existing electrical loads. Thus a vehicle regenerative braking apparatus of simple structure which prevents adverse effects on a battery is possible.

Further, when power to be consumed by excess power consumption loads is adjustable, it is preferable to adjust the power to be consumed by the excess power consumption loads to match the excess power.

According to a preferred embodiment, the load control apparatus completes determination of the excess power consumption load per each calculated value of the excess power or for a predicted value of the excess power before actual generation thereof. Thus, the excess power consumption loads can be activated to effect the consumption of excess power before or as soon as excess power has actually been generated, and delivery of excess current to a battery can be avoided.

According to a preferred embodiment, with respect to a combination of the plurality of excess power consumption loads selected from the plurality of electrical loads, the load control apparatus determines the combination of excess power consumption loads to absorb the excess power corresponding to one of the calculated value, the detected value, and the anticipated value of the excess power and the total of excess power absorbability of the combination, and activates the combination corresponding to the size of the excess power when generation of excess power has been one of calculated, detected, and anticipated. Thus, it is possible to cope with the consumption of excess power, which exceeds the amount of power, that is further consumable by a single selectable excess power consumption load.

According to a preferred embodiment, the load control apparatus stores in memory groups of the electrical loads, which are selectable from the total vehicle electrical loads as the excess power consumption loads, as selectable loads. A single or combination of the excess power consumption loads is selected and decided upon from the selectable loads.

Thus, since selection of non-preferable excess power consumption loads for use as excess power consumption loads is not attempted but instead a pool of selectable excess power consumption loads is pre-formed, the selection of excess power consumption loads is simplified and there is no activation of non-preferable electrical loads for excess power consumption.

According to a preferred embodiment, the load control apparatus delays shutoff of electrical loads among the electrical loads which are presently in activation and can continue to be in activation, when generation of the excess power is one of calculated, detected, and anticipated. Thus, during the generation of excess power, the problem of adverse effects to a battery due to a sudden increase of excess power created by the shutoff of an electrical load in activation can be eliminated.

According to a preferred embodiment of the load control apparatus, when the electrical loads in activation as excess power consumption loads are shut off by manual operation, priority is given to these electrical loads at the next determination event of excess power consumption loads. For example, suppose that the load control apparatus may have already decided to activate the heater as an excess power consumption load despite an already high cabin temperature and thereby a passenger feels discomfort. Even in this case, if there was action by the passenger to shut the heater off, the heater would not be selected as an excess power consumption load at the next determination event by the load control apparatus. In this example, the comfort and other requests of the passenger can be given priority.

Regarding this embodiment, as selection (determination) criteria of electrical loads as excess power consumption loads, it is preferable to take into consideration any adverse effects from activation of each electrical load on passengers and the vehicle. When activation of electrical loads is predicted to have beneficial effects on passengers and the vehicle, it is preferable to elevate the priority in selection of the electrical loads as excess power consumption loads.

According to a preferred embodiment, the load control apparatus performs the determination of the excess power consumption loads so that the total of the increase amounts of power to be consumed by one or a combination of the electrical loads are more than the excess power and below the value of a predetermined margin added to the excess power. Thus, the flow of excessive charge current to a battery can be prevented, and regeneration can be performed within a preferable range.

According to a preferred embodiment, the load control apparatus excludes the electrical loads which are presently in activation from consideration when determining the excess power consumption loads. Thus, inadequate consumption of excess power can be prevented.

A second aspect of the present invention resides in a vehicle regenerative braking apparatus having a generator driven by an engine, the braking apparatus performing vehicle braking by generation of regenerative power during vehicle braking. A battery is charged by the regenerative power and a plurality of electrical loads are supplied by the generator and the battery. A load control apparatus controls the electrical loads. The load control apparatus performs one of calculation, detection, and anticipation of a generation of excess power being the regenerative power exceeding a battery-absorbable maximum charge amount. The load control apparatus delays shutoff of electrical loads maintainable in activation from among the electrical loads presently in activation when performing one of calculation, detection, and anticipation of the generation of the excess power. Thus, the shutoff of electrical loads in activation during generation of excess power, which creates a sudden increase in excess power and adversely affects a battery, can be eliminated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

With reference to the drawings, preferred embodiments of a vehicle regenerative braking apparatus in accordance with the present invention will be described hereinafter.

Figure 1:
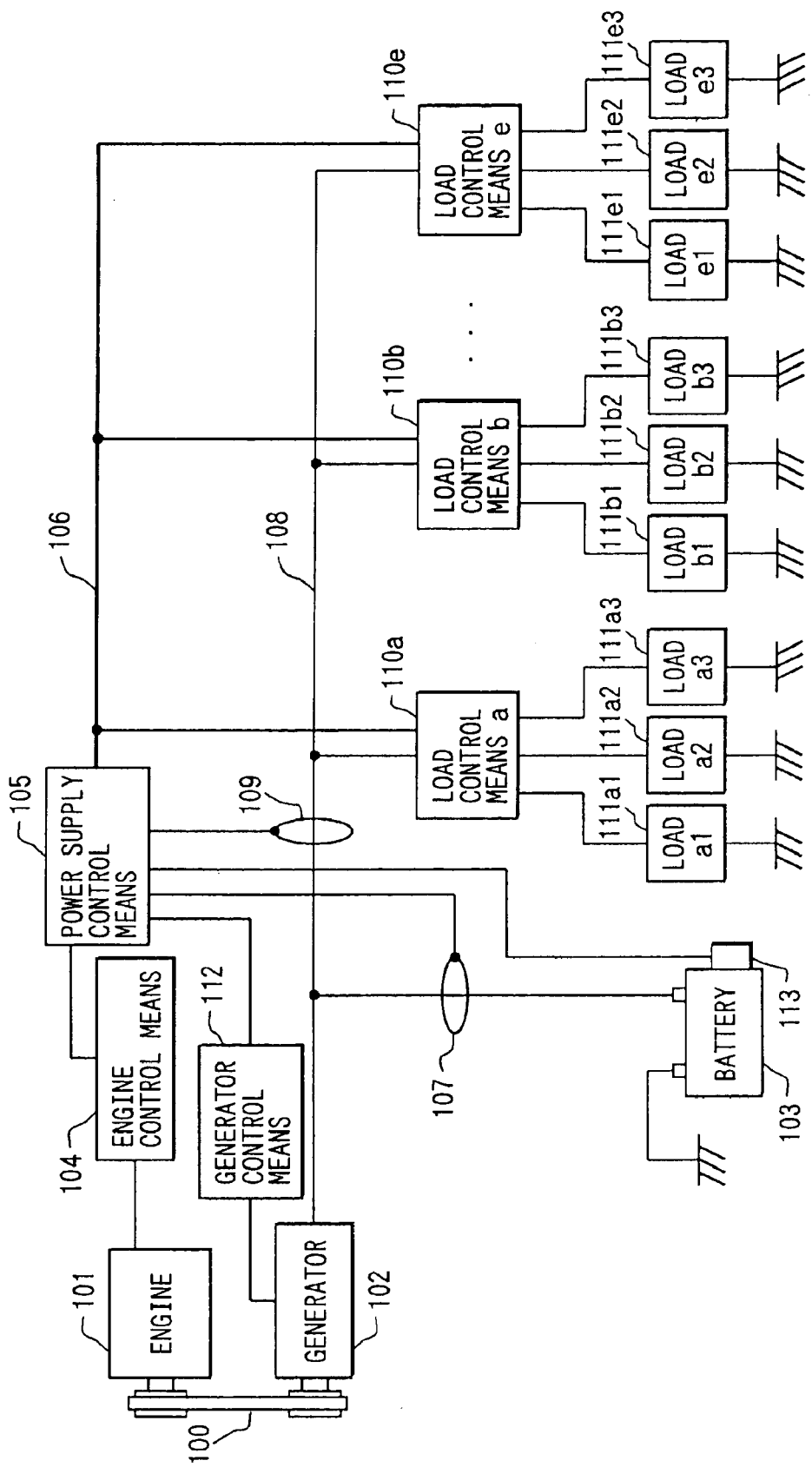
FIG. 1 is a block diagram of an electrical system of a vehicle having a vehicle electrical load driving control apparatus according to an embodiment of the present invention.

FIG. 1 is a block diagram showing an electrical system of a vehicle having a vehicle electrical load driving control apparatus according to one embodiment of the present invention.

Referring to FIG. 1, an engine 101 is linked to a generator 102 by a belt 100. The generator 102 is connected to a battery 103 and to load control means 110a to 110e via power supply line 108. The load control means 110a executes power supply control of loads 111a1 to 111a3, the load control means 110b executes power supply control of loads 111b1 to 111b3, and so forth in the same manner, and the load control means 110e executes power supply control of loads 111e1 to 111e3. The load control means 110a to 110e has operating switches (not shown) and various sensors (not shown) required for carrying out power supply control. Each of the load control means 110a to 110e either performs output control of their respective loads or performs interruption or continuation thereof according to such factors as externally input signals and output signals from the sensors.

The engine control means 104 is connected to the power supply control means 105 to control the engine 101. The engine control means 104 sends to the power supply control means 105 the engine speed and other information detected by the sensors (not shown) that detect the various states of the engine 101, and then increases or decreases the output of the engine 101 in response to a command from the power supply control means 105.

The power supply control means 105 monitors the states of various components including the generator 102, the battery 103, and the power supply line 108, and controls the generator 102 via generator control means 112. The power supply control means 105 is connected to the generator control means 112, and the amount of electrical power output by the generator 102 is controlled by a command from the power supply control means 105.

The generator control means 112 sends to the power supply control means 105 generator information such as the revolution speed and the present amount of electrical power being output by the generator 102. The power supply control means 105 is connected to a battery current sensor 107, a load current sensor 109, a battery temperature sensor 113, and a battery volt sensor (not shown), and receives information on input and output current of the battery, the load current, the battery temperature, and battery voltage. The power supply control means 105 is connected to the load control means 110a to 110e via a multiplex transmission line 106, such that information is sent and received bi-directionally with the load control means 110a to 110e via multiplex communication.

The generator control means 112 receives vehicle braking information from a vehicle controller (not shown) and controls the amount of power output from the generator 102 to a value equivalent to the amount of vehicle braking acknowledged from the vehicle braking information. The field current for the generator 102 is then increased to execute regenerative braking, and generates the necessary amount of braking (regenerative braking). Further, the vehicle controller, for example, calculates a vehicle braking amount equivalent to the degree or amount of operation of the brake operation means such as a brake depression sensor (not shown), and sends a command to a control portion of a hydraulic brake apparatus (not shown) to generate a braking amount which is the total vehicle braking amount minus the regenerative braking amount. Further, the generator control means 112 determines the increased amount of generated power from regenerative braking so that it is within the range of the maximum amount of power that can be produced by the generator 102 and sets it to be within the range of the maximum chargeable amount of the battery 103 (maximum charge amount).

(Regenerative Power Control)

Figure 2:
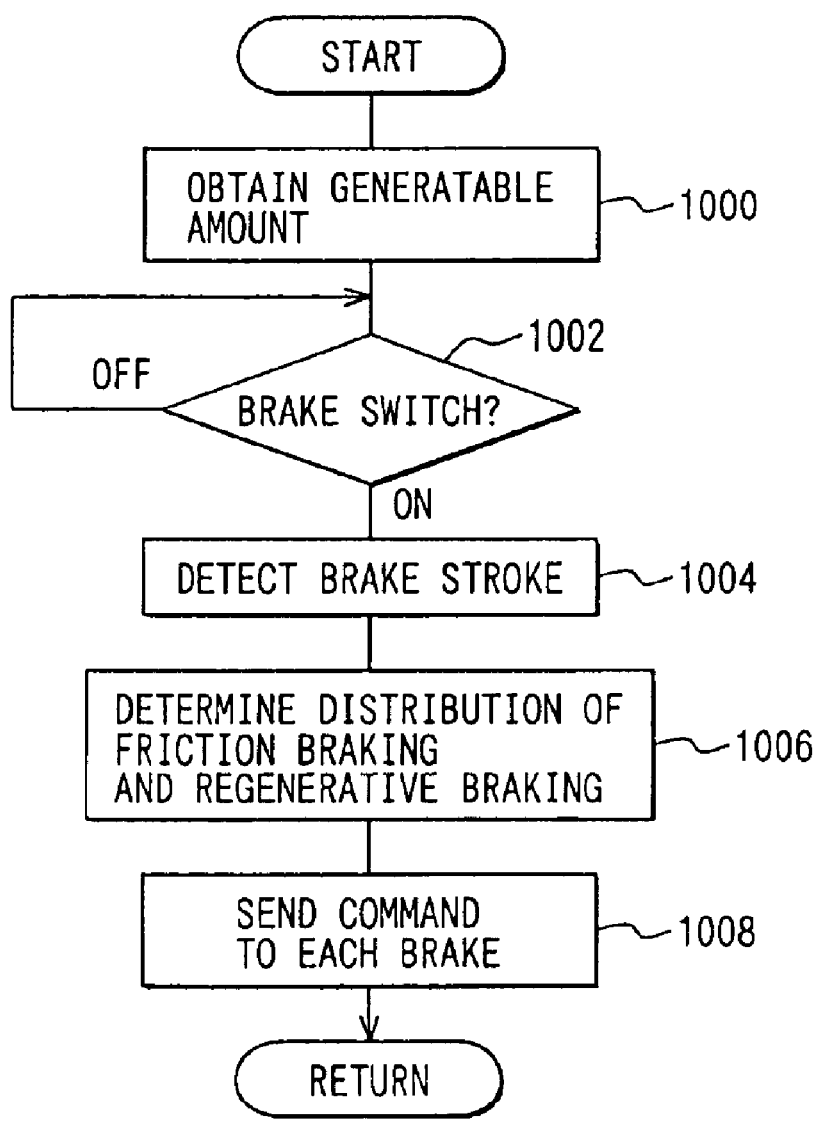
FIG. 2 is a flow chart of an example of control when a driver depresses the brake pedal according to an embodiment of the present invention.

An example of regenerative power control when a driver depresses the brake pedal will be explained with reference to the flow chart of FIG. 2. First, at step 1000, an amount by which generated power may increase is obtained through the aforementioned method. More specifically, the increase amount is calculated based on the battery state and the size limit of the charge amount, on the generator state and the size limit of generated power, and on each electrical load state and the size limit of power being consumed. For example, in the instance of a vehicle having a generator with a maximum rated capacity of 2.0 kW, where a present maximum charge amount of the battery is 1.0 kW and electrical load is consuming 0.5 kW, a generated power increase amount (regenerative power) of up to 1.5 kW is possible.

At step 1002, the routine waits until the brake switch is put into an on state. Once the brake switch is "on," the brake stroke (brake operation amount) is detected at step 1004, and the declaration torque (vehicle braking amount) calculated having a positive correlation to the brake operation amount is divided into regenerative braking torque and mechanical braking torque at step 1006. Here, regenerative braking torque is derived by first finding the numerical value of an increase amount of generated power (regenerative power) divided by the angular velocity of the generator 102, and then multiplying by the speed ratio of the same torque transmission system. Mechanical braking torque is derived by multiplying the mechanical braking torque gained from the friction brake by the speed ratio of the same torque transmission system.

Next, at step 1008, the field current of the generator 102 is controlled so as to generate regenerative power derived by the previous calculations, and a value for regenerative braking torque is simultaneously sent to the control portion of a hydraulic brake (not shown), after which a corresponding mechanical braking torque is generated by the hydraulic brake control portion.

(Handling of Excess Power)

Handling of excess power will now be explained. Excess power is generated when some of the electrical loads are suddenly shut off during regeneration. During regeneration, the battery charge is increased to a level close to the maximum charge amount, which is the maximum chargeable amount, to increase regeneration efficiency. Accordingly, due to sudden shutting-off of electrical loads, there occurs a state where regenerative power exceeds the maximum charge amount of the battery. This excess amount of electrical power will be referred to as "excess power."

For example, given the preceding example where regenerative power is 1.5 kW and 0.5 kW is being consumed by electrical load and there is a present battery maximum charge amount of 1.0 kW, charge to the battery matches and there is no problem. However, if the power being consumed by the electrical loads changes from 0.5 kW to 0.2 kW, 0.3 kW of excess power is generated and the battery 103 is affected.

Figure 3:
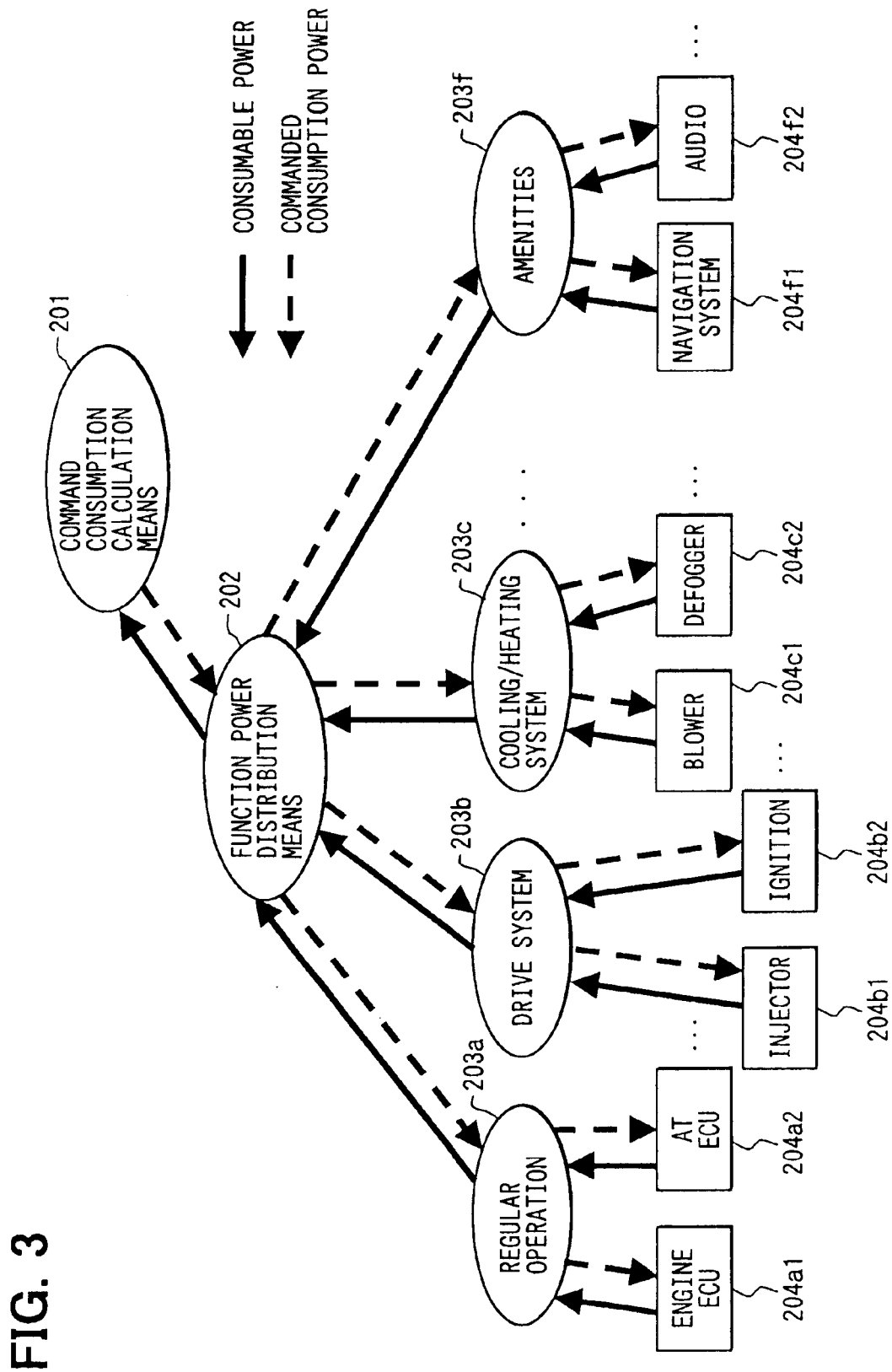
FIG. 3 is a block diagram of an electrical system showing an example of handling excess power according to an embodiment of the present invention.

Handling of excess power will now be explained with reference to the electrical system of FIG. 3. This electrical system shows the excess power distribution control function of the power supply control means 105 shown in FIG. 1. The electrical system has a commanded consumption calculation means 201, function power distribution means 202, an individual load power distribution means 203a to 203f, and a consumable power calculation means 204a1 to 204f2. Each of the individual load power distribution means 203a to 203f controls several of the consumable power calculation means 204a1 to 204f2 as a subordinate group belonging to the means. As shown in FIG. 3, each group is classified in accordance with the function of an electrical load corresponding to each of the consumable power calculation means 204a1 to 204f2.

The commanded consumption calculation means 201 receives the total of power which can be consumed beyond the present point by each electrical load (consumable power) from the function power distribution means 202. When excess power has been generated, the commanded consumption calculation means 201 calculates a power consumption load, which is electrical power to be further consumed by the electrical loads, and sends this to the function power distribution means 202 as a commanded power consumption. If the total of consumable power is smaller than the calculated load power consumption, the load power consumption is regulated to below the total of the consumable power.

The function power distribution means 202 calculates the total of the consumable power based on the consumable power of each group (group consumable power) received from the individual load power distribution means 203a to 203f, and sends this to the commanded consumption calculation means 201. The function power distribution means 202 also distributes the commanded power consumption received from the commanded consumption calculation means 201 to each of the individual load power distribution means 203a to 203f by a predetermined distribution method.

The individual load power distribution means 203a to 203f respectively control the consumable power calculation means 204a1 to 204f2 as a subordinate group belonging to the means. Each of the consumable power calculation means 204a1 to 204f2 is formed with another into groups to which electrical loads of similar functions belong as previously discussed, and each of individual load power distribution means 203a to 203f controls a differing group of the power calculation means.

Each of the individual load power distribution means 203a to 203f receives a consumable power load, which is power that can be further consumed, from each of the consumable power calculation means 204a1 to 204f2, which individually correspond to an electrical load belonging to a group represented thereby. Each of the individual load power distribution means 203a to 203f then outputs a total of each load consumable power as a group consumable power to the function power distribution means 202. Each of the individual load power distribution means 203a to 203f determines the commanded power consumption (commanded power consumption load) to each electrical load by a predetermined distribution method. Each predetermined distribution method operates according to the commanded power consumption (group commanded power consumption) of each subordinate group sent from the function power distribution means 202, as well as according to the consumable power (load consumable power) of the electrical loads belonging to each group, and individually sends each determined commanded power consumption load to each of the consumable power calculation means 204a1 to 204f2 of each load.

The consumable power calculation means 204a1 to 204f2 are established for respective electrical loads in this embodiment. Each of the consumable power calculation means 204a1 to 204f2 determines further consumable power as a load consumable power based on the present power consumption of loads regulated thereby, on the state of the loads, and on other factors. Each of the consumable power calculation means 204a1 to 204f2 then outputs this to one of the individual load power distribution means 203a to 203f controlling the group to which each belongs. Each of the consumable power calculation means 204a1 to 204f2 receives a commanded power consumption load from each of the corresponding load power distribution means 203a to 203f, and also acts in sending this via a multiplex transmission line 106 to each of the load control means 110a to 110e shown in FIG. 1 that control respective loads.

Each of the load control means 110a to 110e, supplies a total of electrical power which includes the added commanded power consumption load to respective electrical loads controlled thereby, based on the received commanded power consumption load. Normal requirements indicated here are discussed in more detail in the publication of Japanese Patent Application No. 2002-311466.

As has been explained, according to this embodiment, the excess power and the total of the present consumable power of groups of electrical loads are derived, and based on these values a commanded power consumption is set, after which the commanded power consumption is distributed to each group and then to each electrical load via a predetermined distribution method.

Further, according to this embodiment, the calculation of excess power was performed according to the excess power actually generated. It is also possible to perform load supply control where the commanded power consumption load to be sent to each electrical load is calculated at regular intervals by the same method for each calculated value of excess power before excess power is generated. Once excess power has actually been generated, the power to be consumed by each electrical load is increased only by the amount of each commanded power consumption load based on the calculated result.

(Control Process)

Figure 4:
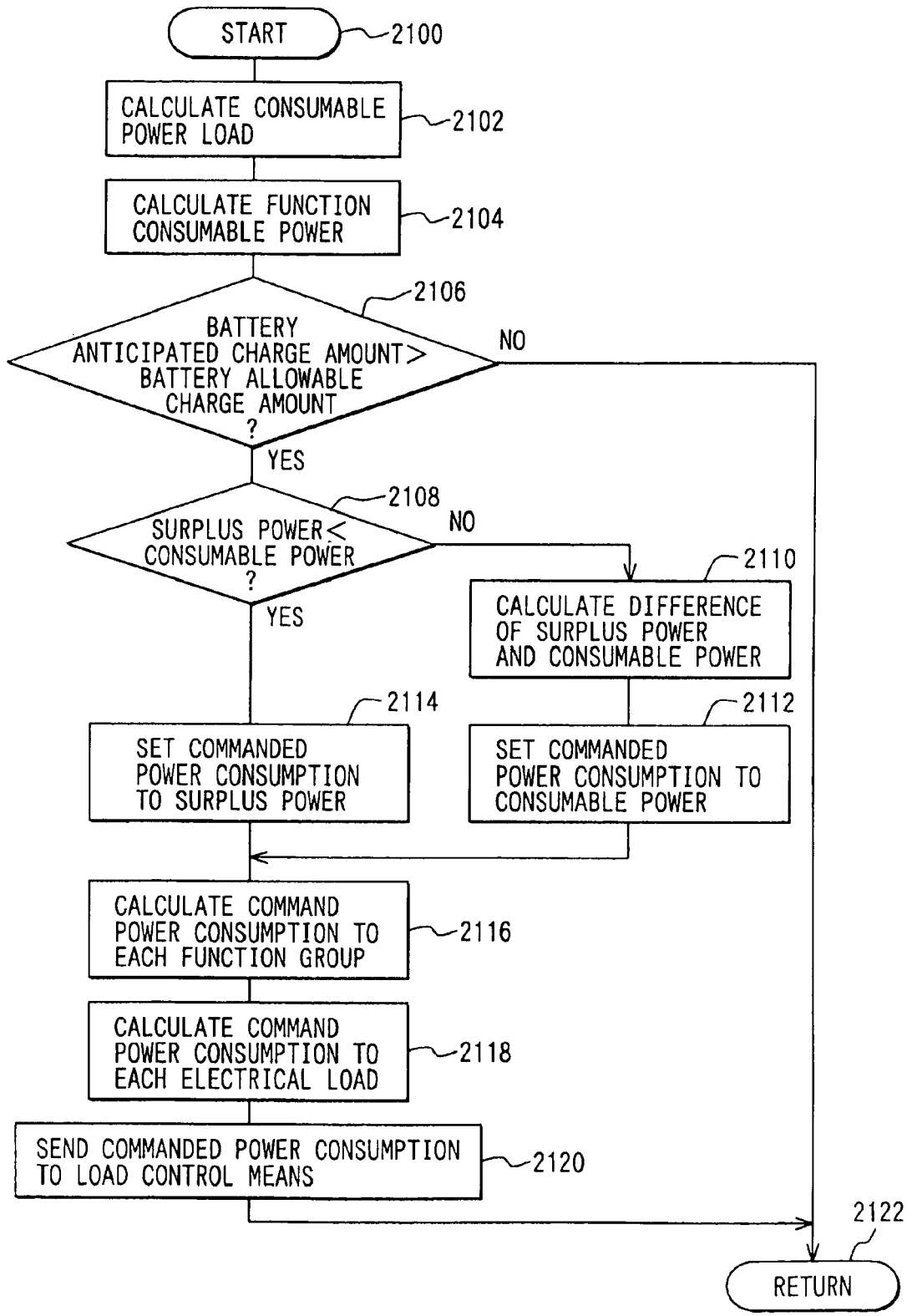
FIG. 4 is a flow chart of a control process of a power supply control means for controlling consumption of excess power according to an embodiment of the present invention.

Next, referring to the flow chart of FIG. 4, the control process of the power supply control means 105 for excess power consumption control will be discussed. First, the routine is started by the commencement of power supply or with generation of excess power at step 2100. At step 2102, which comprises the consumable power calculation means 204a1 to 204f2, power that is further consumable by each load, i.e., consumable power load, is calculated based on each electrical load switched on by the vehicle passengers, on operational states of such components as speaker volume, and on load state. The load consumable power is then sent to the individual load power distribution means 203a to 203f at step 2102.

At step 2104, which comprises the individual power load distribution means 203a to 203f, the total for each consumable power load is calculated. The totals are sent to the function power distribution means 202 which acts in performing higher level distribution control at step 2104.

Next, an anticipated charge amount and a predetermined allowable charge amount (maximum charge amount) for the battery 103 are compared at step 2106, after which the routine finishes at step 2122 if the anticipated charge amount is less than the allowable charge amount. The anticipated charge amount is derived from the difference between a commanded generation amount (commanded regeneration amount) and the present load power requirement. The sum of power for consumption that is required by all the electrical loads is being referred to, however, the sum of power being consumed by all the loads at the present point may also be used. Load power requirement is discussed in more detail in the publication of Japanese Patent Application No. 2002-311466.

If at step 2106 the anticipated charge amount is found to be greater than the allowable charge amount, then surplus power (excess power), which is the difference between the anticipated charge amount and the allowable charge amount, is compared with the consumable power at step 2108. When the consumable power is smaller, the routine proceeds to step 2110 and the difference between the surplus power and consumable power is calculated, and the commanded power consumption is set to the value for consumable power at step 2112, and the routine proceeds to step 2116.

When the consumable power is larger at step 2108, the commanded power consumption is set to the value for surplus power (excess power) at step 2114. Next, the commanded power consumption to be sent to each function group (individual load power distribution means 203a to 203f) is calculated, and is sent to each appropriate function group of individual load power distribution means 203a to 203f at step 2116.

The commanded power consumption to be sent to each function group is determined based on the consumable power of each group, and is determined by a predetermined distribution method for allotting within a range that doesn't exceed the consumable power of each function group. This determination also gives precedence in allotment to groups which include regular loads such as the amenities load group and pumps. Each of the individual load power distribution means 203a to 203f receives its share of commanded power consumption, and calculates the commanded power consumption values for each load belonging thereto by a predetermined distribution method, and the values are sent individually to appropriate loads at step 2118. The commanded power consumption of each load is determined based on the consumable power of each load, however, precedence in allotment is given to loads such as the heater which has a short electrical time constant and to the motor which has a large power consumption during startup. This allotment is carried out within a range that does not exceed the consumable power of each load.

The commanded power consumption is next sent to each of the load control means 110a to 110e at step 2120 appropriately, and the routine finishes at step 2122. After a fixed interval of time, the routine returns to step 2100 and starts again. Thus, each of the load control means 110a to 110e adds a commanded power consumption to either the present power being consumed or to the normally required power and drives a corresponding load. It is also possible to complete the determination of excess power-consuming loads for an anticipated amount of excess power or per each calculated value of excess power before the actual generation thereof.

When generation of excess power has been either calculated, detected, or anticipated, an optimal combination of excess power-consuming loads for the size of the excess power can be realized. From among the total vehicle electrical loads, groups of electrical loads which are selectable as excess power-consuming loads are stored in memory as selectable loads. A single excess power-consuming load or a combination thereof is then selected from among the selectable loads. Determination of the excess power-consuming loads can then be carried out from among the selectable loads. Thus, undesirable increases of power to be consumed from distribution of excess power to electrical loads can be prevented.

Once it has been detected that a passenger intends to manually shut off an electrical load which has had its power consumption increased by commanded power consumption, the consumable power or commanded power consumption to the electrical load can be set to zero for the next distribution of excess power. Thus, a lack of smoothness in driving felt by a driver as a result of power consumption of electrical loads automatically increasing can be prevented. A method for detecting driver operation in such an instance is discussed in the publication of Japanese Patent Application No. 2002-300337.

With the embodiment which has been explained, individual electrical loads are formed into groups per similar function, and these groups are further grouped and controlled in a multi-level hierarchy, however, structuring as a single level is possible.

(Modification)

Figure 5:
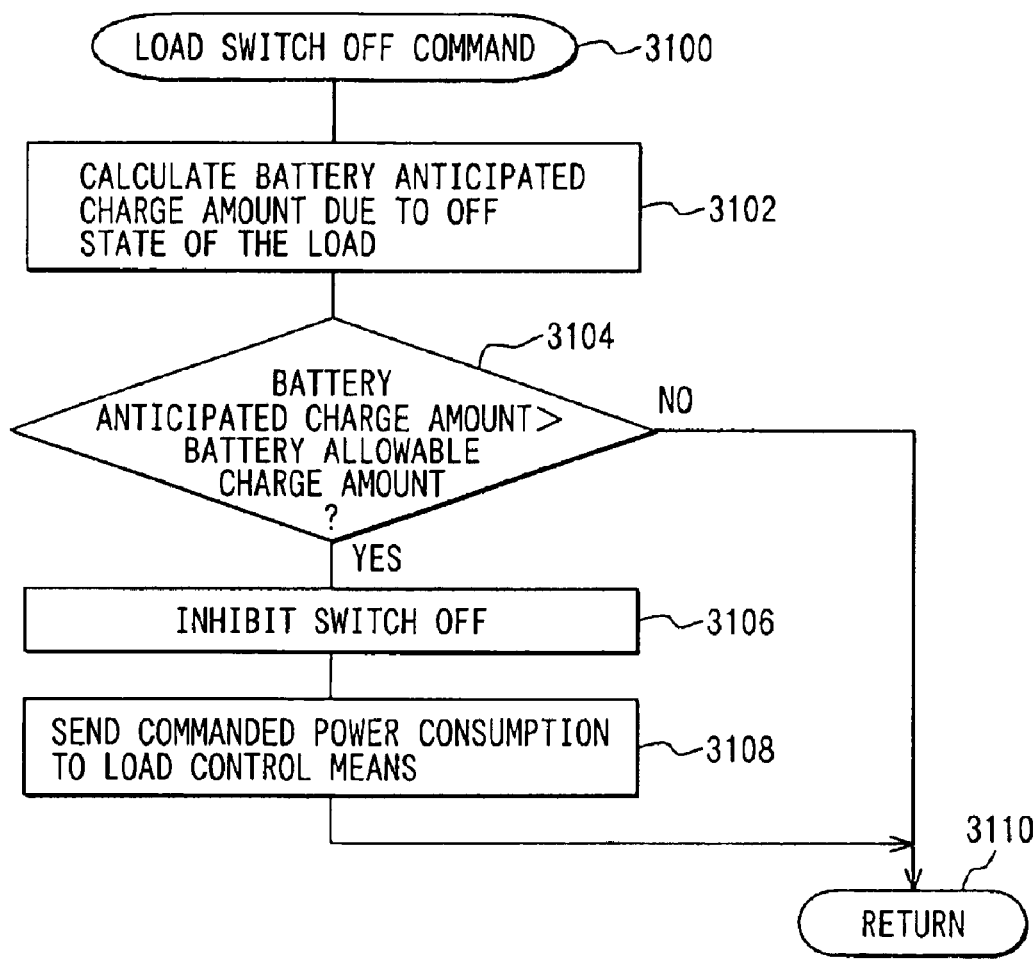
FIG. 5 is a flow chart showing a modification of an embodiment of the present invention.

A modification of the embodiment will be now discussed with reference to FIG. 5. When excess power is being generated when an electrical load switch is put into the off state, the routine shown in FIG. 5 is initiated as an interrupt routine at step 3100 and a battery anticipated charge amount due to the off state of the electrical load is calculated at step 3102. Whether the calculated battery anticipated charge amount exceeds a battery allowable charge amount is checked at step 3104. If the calculated value exceeds the allowable value then the routine proceeds to step 3106 and shut off of the electrical load is not permitted; otherwise, the routine proceeds to step 3110 and returns to the main routine. At step 3108, a signal not to switch off the load, that is, the previous commanded power consumption load, is sent to load control means 110a to 110e, and the routine finishes by proceeding to step 3110. In this manner, generation of excess power can be easily prevented.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle regenerative braking apparatus, comprising:
  a generator driven by an engine and performing vehicle braking by generation of regenerative power during vehicle braking;
  a battery charged by the regenerative power;
  a plurality of electrical loads, wherein the loads are supplied power by the generator and the battery; and
  a load apparatus controlling the electrical loads, wherein the load control apparatus performs one of calculation and detection of a generation of excess power, wherein the excess power is the regenerative power that exceeds a battery-absorbable maximum charge amount, and the load control apparatus determines an excess power consumption load from the plurality of electrical loads to have excess power absorbed according to one of a calculated value and a detected value of the excess power and the excess power absorption capability of the electrical loads before or after generation of the excess power, and activating the excess power consumption load corresponding to the size of the excess power when generation of the excess power has been one of calculated and detected.

2. A vehicle regenerative braking apparatus according to claim 1, wherein
  the load control apparatus completes determination of the excess power consumption load per each calculated value of the excess power or for a predicted value of the excess power before actual generation thereof.

3. The vehicle regenerative braking apparatus according to claim 1, wherein with respect to a combination of the plurality of excess power consumption loads selected from the plurality of electrical loads, the load control apparatus determines the combination of excess power consumption loads to absorb the excess power corresponding to one of the calculated value and the detected value of the excess power and the total of excess power absorbability of the combination, and activates the combination of excess power consumption loads corresponding to the size of the excess power when generation of excess power has been one of calculated and detected.

4. The vehicle regenerative braking apparatus according to claim 1, wherein the load apparatus stores in memory groups of the electrical loads which are selectable from the total vehicle electrical loads as the excess power consumption loads as selectable loads, a single or combination of the excess power consumption loads being selected and decided upon from the selectable loads.

5. The vehicle regenerative braking apparatus according to claim 1, wherein the load control apparatus delays shutoff of electrical loads among the electrical loads that are presently in activation and can continue to be in activation, when generation of the excess power is one of calculated and detected.

6. The vehicle regenerative braking apparatus according to claim 1, wherein with respect to the load control apparatus, when the electrical loads in activation as excess power consumption loads are shut off by manual operation, priority is given to these electrical loads at the next determination event of excess power consumption loads.

7. The vehicle regenerative braking apparatus according to claim 1, wherein the load control apparatus performs the determination of the excess power consumption loads so that the total of the increase amounts of power to be consumed, of one or a combination of the electrical loads, are more than the excess power and below the value of a predetermined margin added to the excess power.

8. The vehicle regenerative braking apparatus according to claim 1, wherein the load control apparatus excludes the electrical loads that are presently in activation from consideration when determining the excess power consumption loads.

9. The vehicle regenerative braking apparatus, comprising:

a generator driven by an engine and performing vehicle braking by generation of regenerative power during vehicle braking;

a battery charged by the regenerative power;

a plurality of electrical loads supplied from the generator and the battery; and a load control apparatus that controls the electrical loads, the load control apparatus performing one of calculation and detection of a generation of excess power, wherein the excess power is the regenerative power that exceeds a battery-absorbable maximum charge amount, and delaying shutoff of electrical loads maintainable in activation from among the electrical loads presently activated when performing one of calculation and detection of the generation of the excess power.

* * * * *